March 1, 1932. C. S. BRAGG ET AL 1,847,999
POWER ACTUATOR
Original Filed March 5, 1925
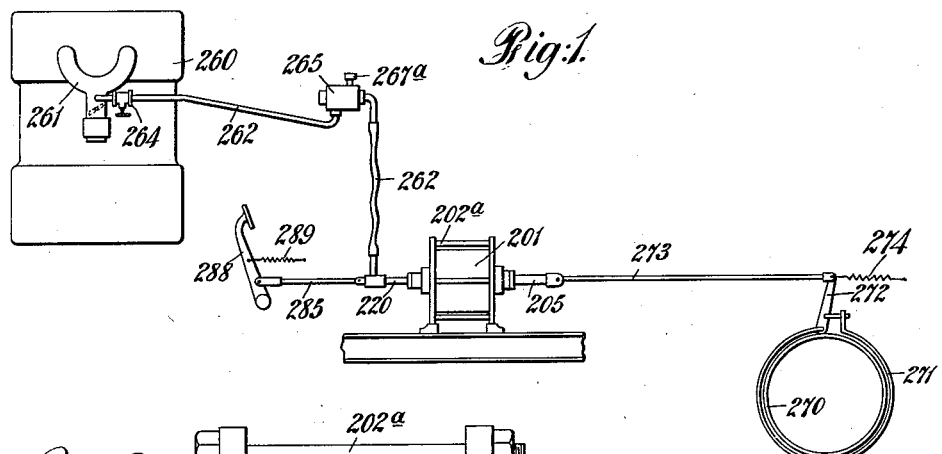
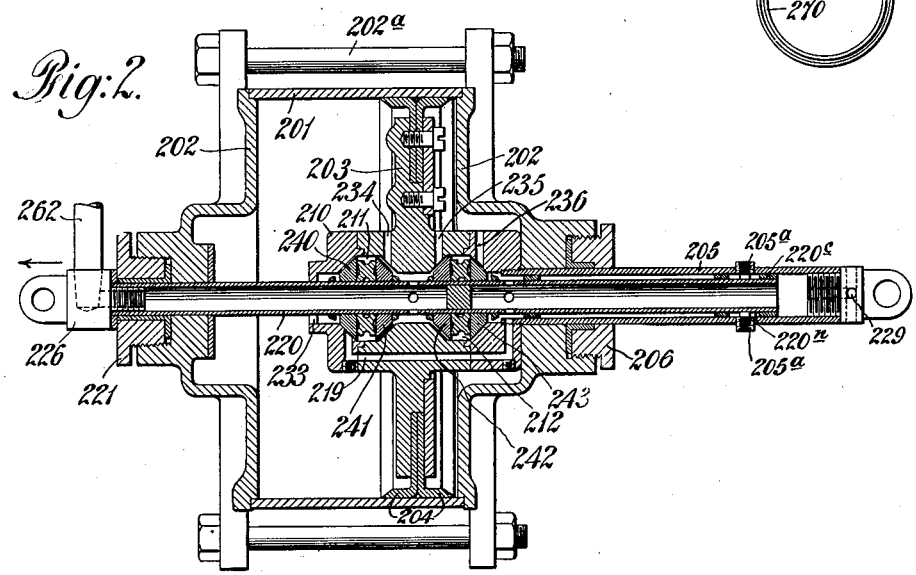
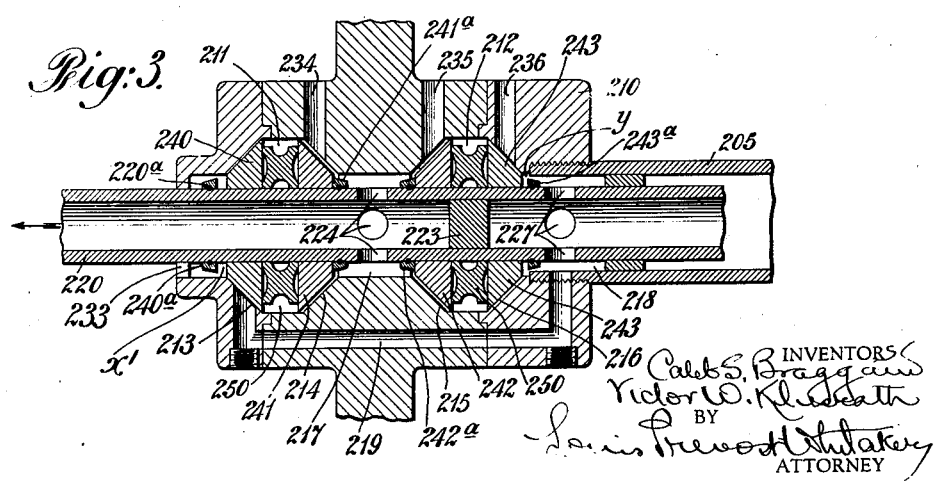

Patented Mar. 1, 1932

1,847,999

UNITED STATES PATENT OFFICE

CALEB S. BRAGG, OF PALM BEACH, FLORIDA, AND VICTOR W. KLIESRATH, OF SOUTH BEND, INDIANA, ASSIGNORS TO BRAGG-KLIESRATH CORPORATION, OF LONG ISLAND CITY, NEW YORK, A CORPORATION OF NEW YORK

POWER ACTUATOR

Original application filed March 5, 1925, Serial No. 13,183. Divided and this application filed April 12, 1928, Serial No. 269,487. Renewed July 20, 1931.

Our invention consists in the novel features hereinafter described, reference being had to the accompanying drawings, which illustrates one embodiment of the same, selected by us for purposes of illustration, and the said invention is fully disclosed in the following description and claims.

This application is a division of our former application for Letters Patent of the United States filed March 5th, 1925, and given Serial No. 13,183.

In our former application for Letters Patent of the United States filed January 5, 1925, and given Serial No. 506, we have described and illustrated a power actuator comprising a cylinder closed at both ends, and a piston therein, and operated by suction from the intake manifold of the internal combustion engine forming part of a motor vehicle, for the purpose of actuating the brake mechanism under the control of an operator operated part connected with a single reversing valve mechanism with which the actuator is provided. This valve mechanism comprises a pair of suction valves normally held in unseated position, and a pair of inlet valves for air or other higher pressure fluid, normally held in seated position when the actuator is in released position, to connect the actuator cylinder on both sides of the piston with the intake manifold, and normally maintain the piston submerged in vacuum. The operator operated part is connected with the valves so as to effect the closing of one of the suction valves and the opening of a corresponding inlet valve by a movement of the operator operated part in either direction, to effect a movement of the piston in the corresponding direction, and upon the reversal of movement of the operator operated part, the suction valves will be simultaneously opened for an instant to permit equalization of pressures on opposite faces of the piston by a transfer of a portion of the higher pressure fluid previously admitted to effect the piston stroke to the opposite side of the piston, both ends of the cylinder being simultaneously connected while the suction valves are in open position, with each other, and with the manifold, after which air or other higher pressure fluid is admitted to the cylinder on the opposite side of the piston to effect its reverse movement and for restoring it and the brake mechanism to the released position.

In the operation of apparatus of this kind, an application of the brakes may be effected by admitting higher pressure fluid only to the portion of the cylinder in rear of the piston and without admitting air or other higher pressure fluid to the suction passage of the engine, but in reversing the position of the valve mechanism, the connection of the opposite ends of the cylinder respectively with the suction and higher pressure fluid inlet are reversed, air previously admitted to apply the brakes being exhausted into the manifold, and new quantities of air being admitted on the forward side of the piston which must thereafter be exhausted.

It frequently happens, however, that the continued application and partial release of the brakes without fully releasing is necessary, as for example, in descending long grades, or in proceeding in traffic on any grade. In such case the operator's foot may not leave the brake pedal for considerable periods, as only a small amount of movement of the pedal is necessary to relieve or apply the effective braking pressures on the bands or drums of the brake mechanism. Continued operation of the actuator under these conditions results in higher pressure fluid, as atmospheric air being admitted alternately to both sides of the piston, which air must be exhausted during the next application or release of the brakes as the case may be, the said air somewhat delaying the action of the actuator if the passage to the intake manifold is restricted or otherwise tending to stall the motor if it is idling, as for example, when the clutch is disengaged.

According to our present invention, the valve actuating devices connected with the operator operated part are so located with respect to the valves, that when the valves are in released position, and the piston is in released or retracted position, or when the valves are in the neutral position in any position of the piston, between the limits of its stroke, the suction valves are held slightly open and a certain amount of lost motion is provided between the actuating device for the inlet valves and said inlet valves. It will thus be seen that the movement of the valve actuating means in either direction from its released or neutral position will insure the closing of the suction valve controlling communication with the cylinder on one face of the piston before the higher pressure inlet valve for that portion of the cylinder is open, so that there is no possibility that air or other higher pressure fluid admitted by the opening of an inlet valve can pass through an open suction valve to the suction passage of the engine at any time, and further providing that when the piston is moving forward to effect the power stroke, if the operator operated part is stopped, the forward movement of the piston will close the open higher pressure valve without opening the corresponding suction valve to hold the brakes as applied. A reverse movement of the valve actuating part will effect the opening of the closed suction valve before the other suction valve can be closed or the other inlet valve can be opened, thus equalizing pressures by transfer of some of the higher pressure fluid from the rear of the piston to the forward side, to permit the brakes to relieve themselves by the draft of the brakes and their retracting means without reconnecting the cylinder forward of the piston with the source of higher fluid pressure, and simultaneously connecting the cylinder on both sides of the piston with the suction source. The brakes can be reapplied by again closing the suction valve controlling the suction connection with the cylinder in rear of the piston, and opening the corresponding inlet valve, and this operation can be repeated as often as desired to release and re-apply the brakes without at any time connecting the cylinder forward of the piston with the higher pressure source. By releasing the operator operated part and permitting its retracting means to completely reverse the valve mechanism, the two suction valves will first be simultaneously held open to permit the transfer of part of the higher pressure fluid to the forward side of the piston, after which the suction valve for the forward side of the piston will close and thereafter the higher pressure inlet valve for the forward end of the cylinder will be open and higher pressure fluid will be admitted forward of the piston, while the other suction valve will be further opened and continue to connect the cylinder in rear of the piston with the suction source. With this construction it will be seen that only a small quantity of air need be admitted to the cylinder forward of the piston to return it to its normal position, as this portion of the cylinder is already partly filled with air transferred to it from the cylinder in rear of the piston, and secondly very little power is required to move the piston rearwardly to release the brakes and the exhaustion of air from the cylinder in rear of the piston enables the return movement of the piston to be accomplished by a comparatively small differential of fluid pressures.

Our invention also provides means for insuring the rest of the valve mechanism in the neutral position so that as the piston comes to rest, the previously opened inlet valve is closed and the previously closed suction valve is partly opened, again establishing equalization of pressures on opposite faces of the piston and connecting the portions of the cylinder on both sides of the piston with each other and with the suction source, thus completing the exhaustion of both ends of the cylinder and maintaining the piston submerged in vacuum until the next operation of the actuator.

Our invention also comprises certain novel features of construction and combination of parts hereinafter fully described and particularly pointed out in the claims.

In order that our present invention may be clearly understood, we have illustrated an embodiment of the same in the accompanying drawings, in which Fig. 1 is a diagrammatic view representing an installation of our improved power actuator in connection with the internal combustion engine of an automotive vehicle for the operation of the brake mechanism thereof.

Fig. 2 is an enlarged sectional view illustrating one form of our improved actuator having one form of our present invention embodied therein, and showing the valve mechanism and the piston in their released or "off" position.

Fig. 3 is an enlarged sectional view of the piston hub and the valve mechanism therein, as shown in Fig. 2.

In Fig. 1 of the accompanying drawings, we have shown, diagrammatically, an installation suitable for use in an automotive vehicle, in which our improved actuator is shown as interposed in the connection between a foot lever, 288, and brake mechanism for the vehicle, diagrammatically represented at 270, 271, 272, 274, indicating respectively a brake drum, brake band and brake lever, and the usual retracting spring, but it is to be understood that our invention is applicable to any form of brake mechanism. 260 represents an internal combustion engine for propelling the vehicle, provided with an intake manifold, indicated at 261, to which is connected, between the throttle valve, 263, and the engine cylinders, a suction pipe, 262, provided with a check valve, 265, and a vent valve, 267ª, normally closed, and opening outwardly. In some instances we may employ an adjustable restricting valve, or regulating valve, indicated at 264, in the suction pipe, as shown. The suction pipe, 262, communicates with the power actuator, the cylinder of which is indicated at 201, in Fig. 1, the said pipe having a flexible portion connected to a hollow valve actuating sleeve, 220, and communicating with reversing valve mechanism. The sleeve, 220, is connected by a link, 285, with the foot lever, 288, which is provided with the usual retracting spring, 289, and the piston rod, 205, of the actuator is connected by link, 273, with the brake lever, 272.

In Fig. 2 we have shown one form of our improved actuator embodying our present invention. In this figure, 201, represents the actuator cylinder, closed at both ends by heads, 202, connected by bolts, 202ª, and nuts. 203, represents the double acting piston, provided with oppositely disposed gaskets, 204. 205 represents a hollow piston rod extending through a stuffing box, 206, in one end of the cylinder. The hub, 210, of the actuator piston, is provided with two valve chambers, 211 and 212, respectively, each of which is provided with two valve seats oppositely disposed to each other, preferably conical and coaxial with the piston. The valve chamber, 211, is shown as provided with valve seats, 213 and 214, the chamber, 212, being similarly provided with valve seats, 215 and 216. The piston hub is provided in this instance with an outlet chamber, or suction chamber, indicated at 217, which can communicate with each of the valve chambers, through the openings in the valve seats, 214 and 215. The piston hub is also provided with a higher pressure chamber, 218, in this instance communicating with the atmosphere, through an aperture, 229 in the hollow piston rod, 205, but which may communicate with any source of higher pressure fluid, at a pressure higher than atmosphere, as for example, burnt gases under pressure, from one or more cylinders of the engine. The chamber, 218, communicates directly with the aperture in the valve seat, 216, and by a lateral passage, 219, with the aperture in the valve seat, 213, at the opposite end of the piston hub. 220 represents the valve actuating part, consisting in this instance of a valve sleeve passing through a stuffing box in the cylinder head, and extending longitudinally through the piston hub, the chambers thereof, and through the hollow piston rod, 205, and being movable longitudinally with respect thereto, to effect the operation of the reversing valves through which it extends coaxially. The valve sleeve is divided into two parts by a central plug, 223, and is provided on one side of said plug with suction apertures, 224, communicating with the suction chamber, 217, and on the other side of said plug with apertures, 227, communicating with the higher pressure chamber, 218, and also with the atmosphere, or other source of higher pressure fluid, admitted through the hollow piston rod, as before stated. The suction chamber, 217, is adapted to be connected with the cylinder on opposite sides of the piston by means of a port, or ports, 234, in the valve seat, 214, and port or ports, 235, in the valve seat, 215. The valve seat, 213, communicates with the cylinder on one side of the piston through the passage, 233, and the valve seat, 216, is provided with a port, or ports, 236, communicating with the cylinder on the opposite side of the piston, thus enabling the higher pressure chamber, 218, to be connected with the cylinder on both sides of the piston.

Each of the valve chambers, 211 and 212, is provided with a pair of oppositely disposed poppet valves, preferably conical, engaging the opposite valve seats, said valves being preferably formed of molded rubber and being movable with respect to the valve actuated sleeve, which passes therethrough, said valve may, however, be formed of other material, if preferred. The valves are indicated at 240, 241, 242 and 243, and are held firmly seated by yielding means, which also provides for sealing the opening in the valve through which the sleeve passes. In the present instance we have shown a rubber cushioning device, 250, of elastic rubber, interposed between the valves, 240 and 241, and between the valves 242 and 243, said cushioning device being annular in form and fitted tightly on the outer surfaces of the valves, and the valve actuating sleeve, and serving the combined purpose of retracting and seating means, and sealing means, for the adjacent valves. The actuating sleeve is provided with means for opening one valve of each pair, when the sleeve is moved to its full extent in either direction. As herein shown this function is performed by four collars, 240ª, 241ª, 242ª and 243ª, secured to the sleeve in any desired manner, as by spring rings 220ª, in a well known way.

In this instance the valve actuating devices, 241ª and 242ª, for the suction valves, are so located that the valves, here indicated at 241 and 242, shall both remain at all times in open position when the valve mechanism is in the "off" or normal position, that is when the piston is fully retracted, or in a neutral position, when the piston is in an interjacent position in the cylinder within the limits of its stroke, and are never simultaneously closed or seated. The valve actuating device, 243ª, is so located with respect to the valve, 243, that a slight lost motion at the point indicated at y, is provided, when the valve sleeve is actuated in a direction to apply the brakes before the said valve actuating device, or collar, engages the inlet valve, 243, and likewise as hereinbefore stated, the collar, 240ª, for actuating the valve, 240, is so located as to provide a certain amount of lost motion at the point indicated by X'. It will be noted that when the piston is in released or retracted position, the valves will be maintained in neutral position by a collar, 126, on the sleeve, 220, engaging a stop, 221, on the head, 202, of the cylinder. In neutral position the suction valves, 241 and 242, will be held slightly opened as shown, in Figs. 2 and 3, thus connecting both ends of the cylinder with the suction passage of the engine through the suction chamber, 217, which will maintain the piston submerged in vacuum. The valves, 241 and 242, being normally unseated when in the "off" or released position, the suction from the suction chamber, 217, insures a rarification within the cylinder on both sides of the piston. When it is desired to apply the brakes, the valve actuating sleeve, 220, is moved in the direction of the arrow in Figs. 2 and 3, thereby opening the valve, 241, a little further, and permitting, by reason of the lost motion indicated at Y, the valve, 242, to close before the lost motion, Y, is taken up, and the valve operating device, or collar, 243ª, comes in contact with the valve, 243, thus shutting off the communication between the cylinder in rear of the piston (to the right in Figs. 2 and 3), and the vacuum chamber, as the valve sleeve is moved further forward, in the direction of the arrow. By the further depression of the pedal, the valve, 243, is opened, admitting pressure fluid (atmospheric air, for example) into the cylinder in rear of the piston, and effecting the forward movement of the piston to apply the brake mechanism. As soon as the forward movement of the valve actuating sleeve, 220, stops, the further movement of the piston will be in respect to the valve sleeve, and will have the effect of seating the pressure inlet valve, 243, and cutting off the supply of fluid pressure, after which the piston will stop under the balanced load of the applied brakes, or the valve, 242, will be opened to a greater or less degree, thereby connecting the two ends of the cylinder on opposite faces of the piston with each other and with the source of suction, until the pressures in the cylinder are equalized with said braking load, when the suction valve, 242, will again close. When the brakes are to be partially released, the operator relieves the pressure on the operator operated part and the retracting spring 289 moves the valve actuating sleeve, 220, in the opposite direction to the arrow in Figs. 2 and 3, thereby first opening the valve, 242, connecting the two ends of the cylinder with each other and with the suction passage, equalizing the pressures on both sides of the piston by transferring part of the higher pressure fluid to the forward side of the piston, and permitting the brakes to release themselves, and exhausting portions of the air admitted for the application of the brakes. If it is desired to effect intermittent application of the brakes, as in descending a long grade, or in traffic, the operator, by very slight manipulations of the brake pedal, can so operate the valve actuating sleeve as to intermittently close the valve, 242, and open the valve, 243, and vice versa, close the valve, 243, and open the valve, 242, so as to permit the brakes to relieve themselves and to be again applied, as previously described, without permitting the brake mechanism and the piston to return to normal position and without at any time opening the valve, 240, by reason of the amount of lost motion provided at X', between the valve, 240, and the valve actuating collar, 240ª, without completely closing the valve 241, hence the cylinder forward of the piston is not connected with the source of higher pressure at any time during such intermittent release and application of the brakes, so that a vacuum is always maintained forward of the piston. When it is desired to restore the parts to their normal positions, the operator can release the pedal, permitting the retracting spring to restore it to normal position, and thereby actuate the valve actuating sleeve in a direction opposite to that indicated by the arrow in Figs. 2 and 3, with the effect that the valve, 243, will be first closed to shut off pressure fluid, the valve, 242, will be opened beyond its normal opening, the valve, 241, will be closed shutting off the communication between the suction chamber and the cylinder forward of the piston, and the valve, 240, will be finally opened after the valve, 241, is closed, admitting pressure fluid by way of the passage, 219, and annular passage, 233, to the cylinder forward of the piston, and thereby returning the piston and brake mechanism to normal or "off" position, under power of the actuator.

It will be obvious that in the operation of our present invention very much smaller quantities of air, or other higher pressure fluid, will be withdrawn from the cylinder and delivered into the intake manifold than would be the case if the valve 240, were opened each time the valve actuating sleeve was moved slightly in the reverse direction, and consequently there is much less danger of stalling the engine if idling, or interfering with its operation by diluting the explosive charges, and further there is no possibility of the air admitted, while either of the inlet valves is open, from passing to the suction passage, since each suction valve closes before the associated inlet valve is opened, by reason of the lost motion between the inlet valves and their operating collars.

As will be seen, there is a certain amount of lost motion between the valve actuating sleeve, 220, and the piston and piston rod, and we provide means for limiting this lost motion, so that after it is taken up, the physical power of the operator may be directly applied to the piston and parts connected therewith, in the manner set forth in our former application, Serial No. 506. In the present instance, the valve actuating sleeve, 220, is provided with a recessed portion, 220$^n$, in a collar, 220$^c$, and the piston rod is provided with oppositely disposed set screws, 205$^a$, extending into the recessed portion, 220$^n$, so that when the brakes are applied, the operator may, by further pushing on the foot lever, add his physical force to the force of the actuator, and so that, should the power of the actuator fail for any reason, the operator may move the piston by his physical force to apply the brake mechanism and prevent accident, the said movement of the valve sleeve placing the valves in position to vent the cylinder and permit this movement. The vent valve, 267$^a$, will permit this action to take place, even if the engine is not running and the throttle and inlet valves of the motor are closed, and will assist in preventing compression of the air, which would have to be expelled from the cylinder under such circumstances.

What we claim and desire to secure by Letters Patent is:—

1. In a power actuator, the combination with a cylinder closed at both ends, a double acting piston in said cylinder, a reversing valve mechanism, including a vacuum chamber, suction passages extending therefrom to the cylinder on both sides of the piston, valves for controlling said suction and inlet passages, yielding means normally tending to seat said valves, and valve actuating means connected with said valves so as to effect the movement of one of said suction valves and one of said inlet valves when said actuating means is moved in either direction, said suction valves being maintained in open position in the released and in the neutral position of the valve mechanism, to connect the portions of the cylinder on opposite faces of the piston with each other and with the suction chamber, and effect rarefication in the cylinder on both sides of the piston, said actuating means being so connected with said valves as to effect, by a movement in either direction, the closing of one of said suction valves, and the further opening of the other before the opening of the inlet valve operated by such movement.

2. In a power actuator, the combination with a cylinder closed at both ends, a double acting piston in said cylinder, a reversing valve mechanism, including a vacuum chamber, suction passages extending therefrom to the cylinder on both sides of the piston, valves for controlling said suction and inlet passages, yielding means normally tending to seat said valves, and valve actuating means connected with said valves so as to effect the movement of one of said suction valves and one of said inlet valves when said actuating means is moved in either direction, said inlet valves being normally seated and both of said suction valves being held in open position in the released and in the neutral position of the valve mechanism, to effect rarefication in the cylinder on both sides of the piston, said actuating means having a provision for lost motion between it and each of said inlet valves, whereby by a movement of said actuating means in either direction one of the suction valves will be moved to closed position and the other in a direction to further open it before the opening of the inlet valve operated thereby.

3. In a suction operated power actuator, deriving its source of suction from the intake manifold of an internal combustion engine, a cylinder closed at both ends, a double acting piston in said cylinder, a connection from the cylinder to said suction passage, inlet means for admitting a higher pressure fluid to the cylinder, and reversing valve mechanism, including passages for connecting said vacuum chamber with the cylinder on both sides of the piston, passages for connecting said inlet with the cylinder on both sides of the piston, valves for controlling said passages, yielding means acting upon said valves in a direction to seat them, an actuating part for said valves, normally holding both of said suction valves in open position when the valve mechanism is in normal or neutral position, and having provision for lost motion between said actuating means and each of said inlet valves, connections between said piston and brake mechanism, and an operator operated part connected with said valve actuating means, whereby, when the actuating means is moved in a direction to apply the brake mechanism, one of said suction valves is permitted to close and the other is further opened before the inlet valve operated by said movement of said actuating means is opened, and whereby by a partial reverse movement the said inlet valve may be permitted to close and the first mentioned suction valve may be opened, without opening the corresponding inlet valve, to equalize pressures on opposite faces of the piston and permit the brake mechanism to release itself, and whereby, by a further reverse movement of said actuating means, the other suction valve may be permitted to close and the last mentioned inlet valve may be opened to return the parts to released position.

4. In a suction operated power actuator for brake mechanism of automotive vehicles deriving its source of suction from the intake manifold of an internal combustion engine, a cylinder, a double acting piston therein, reversing valve mechanism, including a suction chamber connected with said suction producing means and having passages for connecting the end portions of the cylinder on both sides of the piston with each other and with said suction chamber, an inlet for higher pressure fluid and passages therefrom to the cylinder on both sides of the piston, valves for controlling said suction and inlet passages, and yielding means normally tending to seat said valves, and valve actuating means operatively connected with said valves, said valves being held in position to connect both ends of the cylinder with each other and with the suction chamber when the piston is in normal or off position, and being so connected with said actuating means that relative movement thereof with respect to the piston in a direction to apply the brakes will disconnect one end of the cylinder from the suction chamber and connect it with said pressure inlet and effect a corresponding movement of the piston, and relative movement of the actuating means, with respect to the piston in the opposite direction, will first restore the valve mechanism to normal position, permitting rapid substantial equalization of pressures on opposite sides of the piston and permitting a partial reverse movement of the piston under the load of the brake mechanism and consequent reopening of said inlet valve sufficiently to hold said load, without opening the other inlet valve, and a further reverse relative movement of said actuating means will completely reverse the cylinder connections with the suction chamber and pressure inlet to positively restore said piston and brake mechanism to normal position.

5. In a power actuator for brake mechanism of automotive vehicles deriving its source of suction from the intake manifold of the internal combustion engine employed to drive said vehicle, a cylinder, a double acting piston therein operatively connected with said brake mechanism, reversing valve mechanism, including a suction chamber connected to said suction producing means, and having passages for connecting the end portions of the cylinder on both sides of the piston with each other and with said suction chamber, an inlet for higher pressure fluid and passages therefrom to the cylinder on both sides of the piston, valves for controlling said suction and inlet passages, and yielding means normally tending to seat said valves, and valve actuating means operatively connected with said valves, said suction valves being held in open position when the piston is in normal or off position, to connect both ends of the cylinder with each other and with the suction chamber, said valves being so connected to said actuating means that a relative movement of said actuating means with respect to the piston in a direction to apply the brakes will effect the closing of one of said suction valves and the opening of one of said inlet valves, to effect the movement of the piston from its normal or off position, and the relative movement of the actuating means with respect to the piston in the opposite direction will first restore the inlet valves to normal position, permitting a rapid substantial equalization of pressures on opposite sides of the piston, a partial reverse movement of the piston under the load of the brake mechanism, and consequent reopening of said first mentioned inlet valve sufficiently to hold said load, without opening the other inlet valve, and a further reverse relative movement of said actuating means will completely reverse the cylinder connections with the suction chamber and pressure inlet to positively restore said piston and brake mechanism to normal position.

6. In a power actuator, the combination with a cylinder closed at both ends, a double acting piston in the cylinder, suction means for said cylinder and inlet means for supplying higher pressure fluid to the cylinder, of reversing valve mechanism for said actuator, comprising passages for connecting the end portions of the cylinder on opposite sides of the piston with each other and with said suction means, passages for connecting said pressure inlet with the end portions of the cylinder on opposite sides of the piston, valves for controlling said suction and inlet passages, and yielding means normally tending to seat said valves, and valve actuating means connected with said valves, said valve mechanism connecting the end portions of the cylinder with each other and with the suction passage when the piston is in the released or off position, the connection between said valves and their actuating means being such that relative movement of the actuating means with respect to the piston in a direction to effect the movement of the piston from released or off position will disconnect one end of the cylinder from the other and from the suction chamber, and connect it with the pressure inlet, and the relative movement of the actuating device with respect to the piston in the opposite direction will restore the connection of the end portions of the cylinder with each other and with the suction means, to produce rapid substantial equalization of pressures on opposite sides of the piston, without connecting the higher pressure inlet with the other end portion of the cylinder, and on a further reverse relative movement of the valve actuating means with respect to the piston, the end portions of the cylinder will be disconnected from each other and a complete reversal of the connections between the cylinder and the suction and inlet means will be effected, to positively restore the piston to normal or off position, and an operator operated part for the valve actuating means, operatively connected with the piston by means permitting lost motion, whereby the operator may add his physical force to that exerted by the piston and may positively move the piston to apply the brakes in case of failure of power.

7. In a power actuator for brake mechanism of automotive vehicles deriving its source of suction from the intake manifold of the internal combustion engine employed to drive said vehicle, a cylinder, a double acting piston therein, operatively connected with brake mechanism, reversing valve mechanism for the actuator comprising a valve casing movable with the piston and provided with suction passages communicating with the actuator cylinder on opposite sides of the piston and with said suction source, and inlet passages for connecting the cylinder on opposite sides of the piston with a source of higher fluid pressure, a pair of oppositely disposed suction valves for controlling said suction passages, a pair of oppositely disposed inlet valves for controlling said inlet passages, a valve actuating part extending through all of said valves and movable longitudinally with and with respect to the valve casing, said valves being movable with respect to the said actuating part and being provided with means for sealing them with respect thereto, yielding means normally pressing each of said valves toward its closed position, collars on said valve actuating part constructed to hold both of said suction valves in partly open position when the valve actuating part is in neutral and released position, collars on said actuating part for effecting the opening of the inlet valves, spaced a distance therefrom to provide lost motion to effect the closing of one of said suction valves before the opening of the corresponding inlet valve, by a movement of said valve actuating part in either direction from its neutral position, and an operator operated part connected with said valve actuating part.

8. In a power actuator for brake mechanism of automotive vehicles deriving its source of suction from the intake manifold of the internal combustion engine employed to drive said vehicle, a cylinder, a double acting piston therein, operatively connected with brake mechanism, reversing valve mechanism for the actuator comprising a valve casing movable with the piston and provided with suction passages communicating with the actuator cylinder on opposite sides of the piston and with said suction source, and inlet passages for connecting the cylinder on opposite sides of the piston with a source of higher fluid pressure, a pair of oppositely disposed suction valves for controlling said suction passages, a pair of oppositely disposed inlet valves for controlling said inlet passages, a valve actuating part extending through all of said valves and movable longitudinally with and with respect to the valve casing, said valves being movable with respect to the said actuating part and being provided with means for sealing them with respect thereto, yielding means normally pressing each of said valves toward its closed position, collars on said valve actuating part constructed to hold both of said suction valves in partly open position when the valve actuating part is in neutral and released position, collars on said actuating part for effecting the opening of the inlet valves, spaced a distance therefrom to provide lost motion to effect the closing of one of said suction valves before the opening of the corresponding inlet valve, by a movement of said valve actuating part in either direction from its neutral position, an operator operated part connected with said valve actuating part, retracting means for said operator operated part, and valve actuating part, and means for arresting the return movement of said valve actuating part when the piston is returned to retracted position, to hold said valve actuating part in its neutral position and connect the portions of the cylinder on opposite faces of the piston with each other and with the source of suction.

9. In a power actuator for brake mechanism of automotive vehicles deriving its source of suction from the intake manifold of the internal combustion engine employed to drive said vehicle, a cylinder, a double acting piston therein, operatively connected with the brake mechanism, reversing valve mechanism for the actuator comprising a valve casing movable with the piston and provided with suction passages communicating with the actuator cylinder on opposite sides of the piston and with said suction source, and inlet passages for connecting the cylinder on opposite sides of the piston with a source of higher fluid pressure, a pair of oppositely disposed suction valves for controlling said suction passages, a pair of oppositely disposed inlet valves for controlling said inlet passages, a valve actuating part extending through all of said valves and movable longitudinally with and with respect to the valve casing, said valves being movable with respect to the said actuating part and being provided with means for sealing them with respect thereto, yielding means normally pressing each of said valves toward its closed position, collars on said valve actuating part constructed to hold both of said suction valves in partly open position when the valve actuating part is in neutral and released position, collars on said actuating part for effecting the opening of the inlet valves, spaced a distance therefrom to provide lost motion to effect the closing of one of said suction valves before the opening of the corresponding inlet valve, by a movement of said valve actuating part in either direction from its neutral position, an operator operated part connected with said valve actuating part and operatively connected by means providing lost motion to insure the operation of the valve mechanism with the brake mechanism operated by the actuator piston.

10. In a power actuator for brake mechanism of automotive vehicles deriving its source of suction from the throttle controlled suction passage of an internal combustion engine, a power actuator comprising a cylinder, a double acting piston therein operatively connected with said brake mechanism, reversing valve mechanism including a valve casing movable with the piston and having suction passages communicating with the throttle controlled portion of said suction passage for connecting portions of the cylinder on opposite faces of the piston with each other and with said suction passage, said casing being also provided with inlet passages communicating with a source of higher pressure for connecting said source of higher pressure with the cylinder on opposite faces of the piston, oppositely disposed suction valves for controlling said suction passage, and oppositely disposed inlet valves for controlling said inlet passages, yielding means normally tending to seat said valves, a valve actuating part extending through all of said valves and movable with and with respect to the valve casing, said valves being movable with respect to the valve actuating part and being sealed with respect thereto, collars on said valve actuating part normally holding both suction valves in partly opened position when said actuating part is in neutral or released position, collars on said actuating part for effecting the opening of the inlet valves, spaced a distance therefrom to provide lost motion to effect the closing of one of said suction valves before the opening of the corresponding inlet valve by a movement of said valve actuating part in either direction from its neutral position, and an operator operated part connected with said valve actuating part.

11. In a power actuator for brake mechanism of automotive vehicles deriving its source of suction from the throttle controlled suction passage of an internal combustion engine, a power actuator comprising a cylinder, a double acting piston therein operatively connected with said brake mechanism, reversing valve mechanism including a valve casing movable with the piston and having suction passages communicating with the throttle controlled portion of said suction passage for connecting portions of the cylinder on opposite faces of the piston with each other and with said suction passage, said casing being also provided with inlet passages communicating with a source of higher pressure for connecting said source of higher pressure with the cylinder on opposite faces of the piston, oppositely disposed suction valves for controlling said suction passage, and oppositely disposed inlet valves for controlling said inlet passages, yielding means normally tending to seat said valves, a valve actuating part extending through all of said valves and movable with and with respect to the valve casing, said valves being movable with respect to the valve actuating part and being sealed with respect thereto, collars on said valve actuating part normally holding both suction valves in partly opened position when said actuating part is in neutral or released position, collars on said actuating part for effecting the opening of the inlet valves, spaced a distance therefrom to provide lost motion to effect the closing of one of said suction valves before the opening of the corresponding inlet valve by a movement of said valve actuating part in either direction from its neutral position, an operator operated part connected with said valve actuating part, retracting means for said operator operated part and valve actuating part, and means for arresting the return movement of said valve actuating part when the piston is returned to retracted position, to hold said valve actuating part in its neutral position and connect the portions of the cylinder on opposite faces of the piston with each other and with the source of suction.

12. In a power actuator for brake mechanism of automotive vehicles deriving its source of suction from the throttle controlled suction passage of an internal combustion engine, a power actuator comprising a cylinder, a double acting piston therein operatively connected with said brake mechanism, reversing valve mechanism including a valve casing movable with the piston and having suction passages communicating with the throttle controlled portion of said suction passage for connecting portions of the cylinder on opposite faces of the piston with each other and with said suction passage, said casing being also provided with inlet passages communicating with a source of higher pressure for connecting said source of higher pressure with the cylinder on opposite faces of the piston, oppositely disposed suction valves for controlling said suction passage, and oppositely disposed inlet valves for controlling said inlet passages, yielding means normally tending to seat said valves, a valve actuating part extending through all of said valves and movable with and with respect to the valve casing, said valves being movable with respect to the valve actuating part and being sealed with respect thereto, collars on said valve actuating part normally holding both suction valves in partly opened position when said actuating part is in neutral or released position, collars on said actuating part for effecting the opening of the inlet valves, spaced a distance therefrom to provide lost motion to effect the closing of one of said suction valves before the opening of the corresponding inlet valve by a movement of said valve actuating part in either direction from its neutral position, an operator operated part connected with said valve actuating part and operatively connected by means providing lost motion sufficient to insure the operation of said valve mechanism with the brake mechanism connected with said actuator piston, retracting means for the operator operated part and valve actuating part, and means for arresting the valve actuating part in its neutral position when the piston is returned to its retracted position to release the brake mechanism operatively connected therewith.

13. In a brake system for automotive vehicles provided with an internal combustion engine having a suction passage, the combination with a power actuator comprising a cylinder closed at both ends, and a piston in the cylinder, suction passages for connecting said cylinder on both sides of the piston with the suction passage of the engine, an inlet passage for higher pressure fluid communicating with the cylinder in rear of the piston, suction and inlet valves controlling said respective passages, brake mechanism operatively connected with the actuator piston, and operative means for preventing the simultaneous closing of said suction valves, normally holding said valves in partially open position, and the inlet valve in closed position when said operating means is in neutral position, and movable in one direction to open said inlet valve after the closing of the suction valve for the suction passage communicating with the cylinder in rear of the piston, to effect the power stroke of the piston to apply said brake mechanism.

14. In a brake system for automotive vehicles provided with an internal combustion engine having a suction passage, the combination with a power actuator comprising a cylinder closed at both ends, and a piston in the cylinder, suction passages for connecting said cylinder on both sides of the piston with the suction passage of the engine, an inlet passage for higher pressure fluid communicating with the cylinder in rear of the piston, suction and inlet valves controlling said respective passages, brake mechanism operatively connected with the actuator piston, and operative means for preventing the simultaneous closing of said suction valves, normally holding said valves in partially open position, and the inlet valve in closed position when said operating means is in neutral position, and movable in one direction to open said inlet valve after the closing of the suction valve for the suction passage communicating with the cylinder in rear of the piston, and the further opening of the other suction valve to effect the power stroke of the piston to apply said brake mechanism.

15. In a brake system for automotive vehicles provided with an internal combustion engine having a suction passage, the combination with a power actuator comprising a cylinder closed at both ends, and a piston in the cylinder, suction passages for connecting said cylinder on both sides of the piston with the suction passage of the engine, inlet passages for higher pressure fluid communicating with the cylinder on opposite sides of the piston, suction and inlet valves controlling said respective passages, operating means for said valves normally holding said inlet valves closed and said suction valves partially open when said operating means is in neutral position, and constructed to prevent the simultaneous closing of the suction valves, said operating means being movable in either direction to effect the opening of an inlet valve after the closing of the suction valve for the suction passage communicating with the cylinder on the same side of the piston.

16. In a brake system for automotive vehicles provided with an internal combustion engine having a suction passage, the combination with a power actuator comprising a cylinder closed at both ends, and a piston in the cylinder, suction passages for connecting said cylinder on both sides of the piston with the suction passage of the engine, inlet passages for higher pressure fluid communicating with the cylinder on opposite sides of the piston, suction and inlet valves controlling said respective passages, operating means for said valves normally holding said inlet valves closed and said suction valves partially open when said operating means is in neutral position, and constructed to prevent the simultaneous closing of the suction valves, said operating means being movable in either direction to effect the opening of an inlet valve after the closing of the suction valve for the suction passage communicating with the cylinder on the same side of the piston, and further opening the suction valve for the suction passage communicating with the cylinder on the other side of the piston.

17. In a brake system for automotive vehicles provided with an internal combustion engine having a suction passage, the combination with a power actuator comprising a cylinder closed at both ends, and a piston in the cylinder, suction passages for connecting said cylinder on both sides of the piston with the suction passage of the engine, inlet passages for higher pressure fluid communicating with the cylinder on opposite sides of the piston, suction and inlet valves controlling said respective passages, operating means for said valves normally holding said inlet valves closed and said suction valves partially open when said operating means is in neutral position, and constructed to prevent the simultaneous closing of the suction valves, said operating means being movable in either direction to effect the opening of an inlet valve after the closing of the suction valve for the suction passage communicating with the cylinder on the said side of the piston, and further opening the suction valve for the suction passage communicating with the cylinder on the other side of the piston, an operator operated part connected with said valve operating means, and operatively connected by means permitting lost motion with the brake mechanism operated by said piston.

18. In a brake system for automotive vehicles provided with an internal combustion engine having a suction passage, the combination with a power actuator comprising a cylinder closed at both ends, and a piston in the cylinder, suction passages for connecting said cylinder on both sides of the piston with the suction passage of the engine, an inlet passage for higher pressure fluid communicating with the cylinder in rear of the piston, suction and inlet valves controlling said respective passages, brake mechanism operatively connected with the actuator piston, and operative means for preventing the simultaneous closing of said suction valves, normally holding said valves in partially open position, and the inlet valve in closed position when said operating means is in neutral position, and movable in one direction to open said inlet valve after the closing of the suction valve for the suction passage communicating with the cylinder in rear of the piston, to effect the power stroke of the piston to apply said brake mechanism, and means for maintaining said valve operating means in neutral position to connect the cylinder on both sides of the piston with said suction passage and maintain the piston submerged in vacuum when the parts are in released position.

19. In a brake system for automotive vehicles provided with an internal combustion engine having a suction passage, the combination with a power actuator comprising a cylinder closed at both ends, and a piston in the cylinder, suction passages for connecting said cylinder on both sides of the piston with the suction passage of the engine, inlet passages for higher pressure fluid communicating with the cylinder on opposite sides of the piston, suction and inlet valves controlling said respective passages, operating means for said valves normally holding said inlet valves closed and said suction valves partially open when said operating means is in neutral position, and constructed to prevent the simultaneous closing of the suction valves, said operating means being movable in either direction to effect the opening of an inlet valve after the closing of the suction valve for the suction passage communicating with the cylinder on the same side of the piston, and further opening the suction valve for the suction passage communicating with the cylinder on the other side of the piston, an operator operated part connected with the valve operating means, retracting means for the operator operated part, retracting means for said brake mechanism, and means for arresting the valve operating means in neutral position when the parts are in released position, to connect the cylinder on both sides of the piston with the suction passage and maintain the piston submerged in vacuum.

20. In a power actuator, the combination with a cylinder and a piston movable therein, passages for connecting the said cylinder on both sides of the piston with sources of higher and lower fluid pressure, valves for controlling said passages, a valve operating member passing through said valves and movable with and with respect to the same, spaced collars rigid with said member and engaging the valves controlling the passages for lower pressure to hold them normally open when the piston is in released position, to submerge the piston in said lower pressure fluid, and valve operating collars rigid with said member and slightly spaced from the higher pressure valves which they control, the space between one of the said collars and its corresponding valve being greater than the distance between the other collar and its corresponding valve.

In testimony whereof we affix our signatures.

CALEB S. BRAGG.
VICTOR W. KLIESRATH.